Feb. 5, 1946.  R. R. CURTIS ET AL  2,394,431
FUEL SUPPLY SYSTEM
Filed Aug. 15, 1942  2 Sheets-Sheet 1
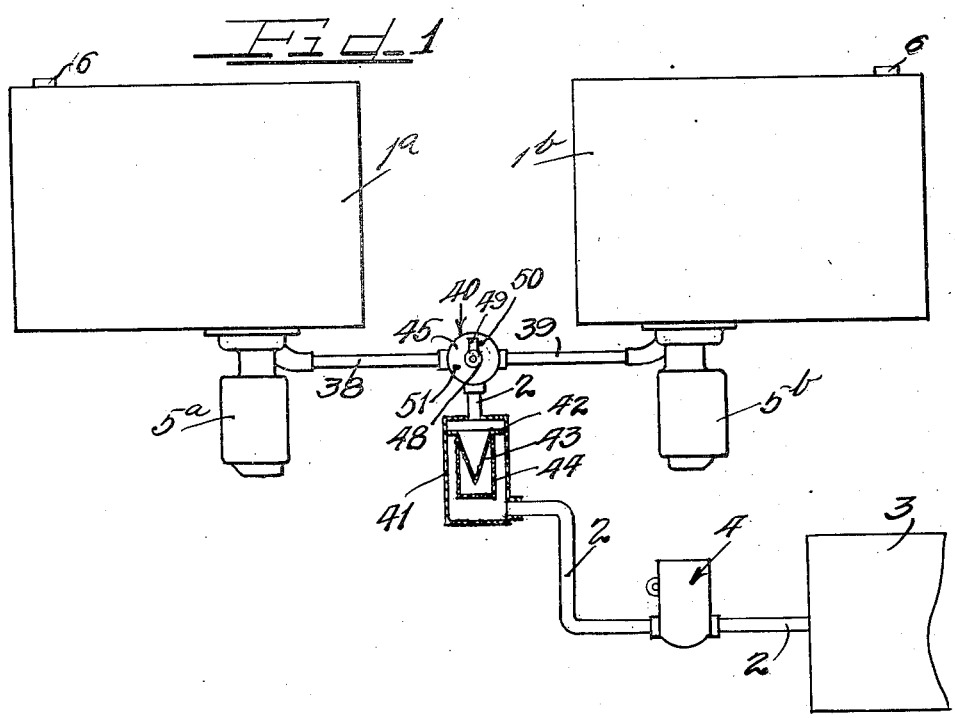
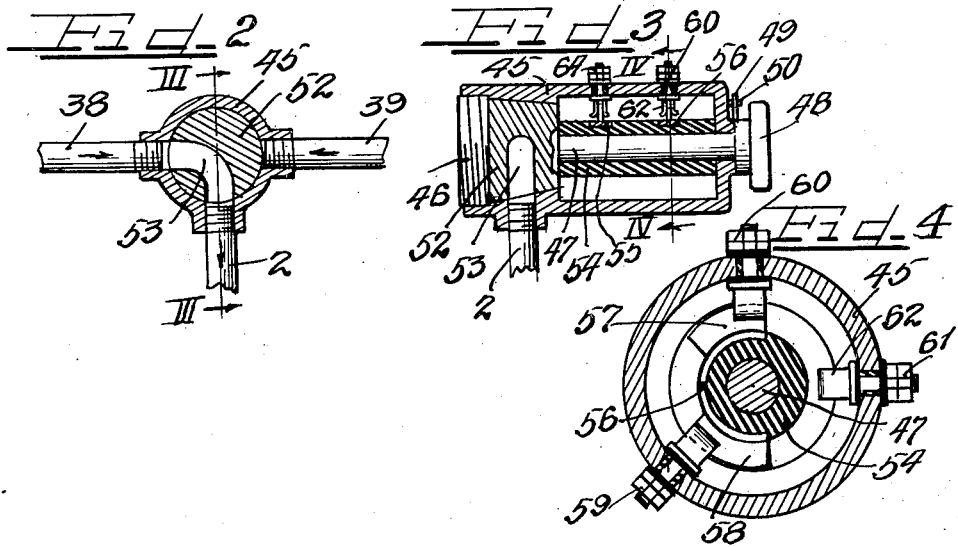
INVENTORS
Russell R. Curtis
Frederick H. Heckert.

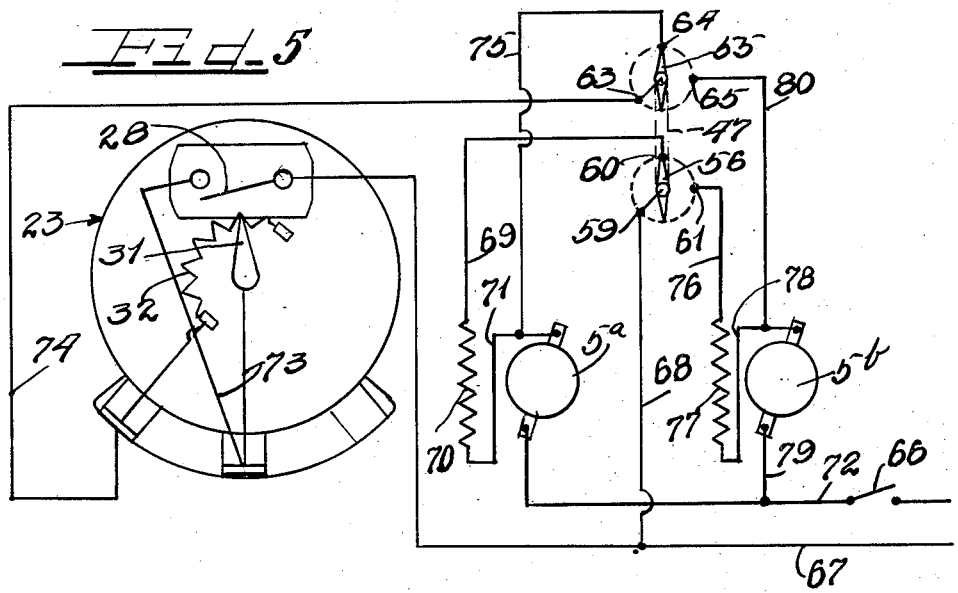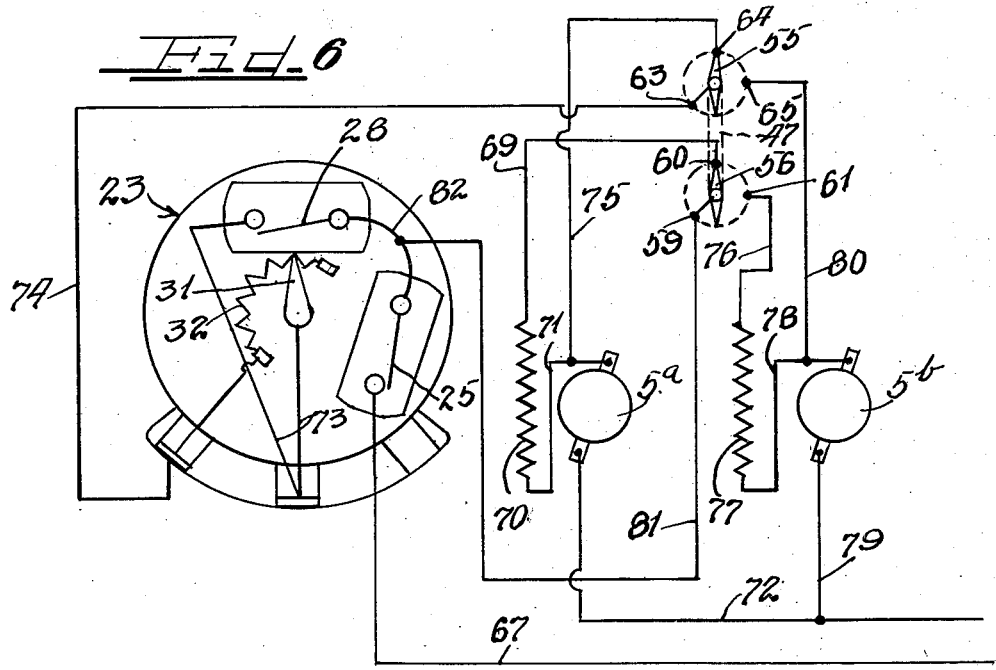

Patented Feb. 5, 1946

2,394,431

UNITED STATES PATENT OFFICE 2,394,431

FUEL SUPPLY SYSTEM

Russell R. Curtis and Frederick W. Heckert, Dayton, Ohio, assignors to Curtis Pump Company, Dayton, Ohio, a corporation of Ohio Application August 15, 1942, Serial No. 455,006

10 Claims. (Cl. 158—36.3)

This invention relates to improvements in a fuel supply system, and more particularly to a fuel supply system highly desirable for use in airplanes or other mechanisms embodying internal combustion engines operating at high altitudes, although the invention will have other uses and purposes as will be apparent to one skilled in the art.

More specifically, the invention relates to a fuel supply system including a supply tank, a fuel consuming device such as an internal combustion engine, a pipeline between the supply tank and the consuming device, and a plurality of pumps in series in the pipeline, one of which pumps may be a main fuel supply pump to provide pressured fuel to the consuming device, and the other pump or pumps may be in the nature of booster pumps to augment the main pump in the event the main pump cannot supply fuel under adequate pressure.

In fuel supply systems for airplanes, for example, the main fuel pump, which is usually driven by the internal combustion engine, often fails to deliver the fuel to the engine under adequate pressure, after the airplane reaches a certain altitude. This failure of the fuel pump to maintain the desired pressure is due to the drop in ambient air pressure. Therefore, if the plane flies at high altitudes, it is necessary to utilize auxiliary means to maintain the proper fuel pressure. A booster pump is usually disposed in series with the main fuel pump, and pressured fuel may be supplied to the engine by either the booster or main pump, or by both. It is, of course, desirable to be able to vary the speed of the booster pump, and consequently be able to selectively vary the output pressure of the booster pump so that a substantially constant pressure may be maintained in the fuel line regardless of the altitude of the plane.

With the foregoing in mind, it is an important object of the instant invention to provide a fuel supply system, highly desirable for use in aircraft, in which an electrically driven booster pump is connected in series with the main fuel pump in the fuel supply pipeline, and means are provided for selectively varying the speed of the booster pump.

Another object of this invention resides in the provision of a fuel supply system including a main fuel pump and an electrically driven booster pump, means for selectively energizing the booster pump, and further, for selectively connecting a variable resistance in shunt with the field of the pump motor to permit desired variations in the speed of the pump. A further object of the invention resides in the provision of a fuel supply system including an electrically driven booster pump, in addition to the main fuel supply pump, with an electric circuit including the field of the motor of the booster pump, and a manually operable control arrangement by which the booster pump may be energized to operate at its normal speed, and by which a variable resistance may be shunted across the field of the booster pump motor to permit selective variation of the speed of the pump.

It is also an object of this invention to provide a fuel supply system including a plurality of fuel supply tanks each connected to a common junction point with the main fuel supply pipeline, with a booster pump associated with each supply tank, and automatic valve means at the junction point for selectively connecting any particular supply tank with the main fuel supply pipeline and at the same time energizing the respective booster pump and cutting out the remainder of the booster pumps.

Still another object of the invention is the provision of a fuel supply system including a plurality of fuel supply tanks each having a booster pump associated with its outlet, a main fuel supply pipeline, and valve means for selectively connecting a particular one of said tanks to the main supply pipeline, the valve means being automatically operable to cause operation of the particular booster pump associated with the tank connected to the main pipeline, and cause the remainder of the booster pumps to cease operation.

A further feature of the invention resides in the provision of a fuel supply system incorporating a pair of separated supply tanks each having an electrically driven booster pump associated therewith, and valve means for selectively connecting either of said tanks to the fuel supply pipeline and at the same time cut out the other tank, there being automatic switch means operable with said valve means to energize the booster pump associated with the connected tank, and de-energize the booster pump associated with the disconnected tank.

It is also a feature of the invention to provide a fuel supply system embodying a pair of separated fuel supply tanks having a delivery line leading to a junction point with an electrically driven pump in each of said lines, and a main fuel supply pipeline leading away from said junction point, there being valve means at the junction point for selectively connecting either tank with the main pipeline, said valve means automatically energizing the pump in the connected delivery line and de-energizing the pump in the disconnected delivery line at each operation, and the system further including variable resistance means selectively connectable in circuit to shunt the field winding of the electrically driven pumps, such variable resistance means being effective regardless of which pump is operating.

Still a further object of the invention resides in the provision of a fuel supply system wherein valve means are utilized to shift from one fuel supply tank to another, the action of the valve means automatically cutting out an electrically driven pump associated with the disconnected tank, and automatically cutting in an electrically driven pump associated with the connected tank, this system further embodying an electrical circuit including the motors of both pumps and variable resistance means selectively connectable in shunt with the field circuit of each motor so as to permit variation of the speed of whichever motor may be in circuit connection at the time.

While some of the more salient features, characteristics and advantages of the instant invention have been above pointed out, others will become apparent from the following disclosures, taken in conjunction with the accompanying drawings, in which:

Figure 1 is a diagrammatic part sectional, part elevational view of a fuel supply system embodying principles of the instant invention, employing a plurality of fuel supply tanks, the electrical circuit being omitted from this figure;

Figure 2 is a fragmentary enlarged part sectional, part elevational view illustrating the operation of the valve means seen in the central portion of Figure 1;

Figure 3 is a fragmentary vertical sectional view, with parts shown in elevation, taken substantially as indicated by the line III—III of Figure 2 looking in the direction of the arrows;

Figure 4 is an enlarged transverse sectional view, with parts in elevation, taken substantially as indicated by the line IV—IV of Figure 3;

Figure 5 is a diagrammatic showing of a form of electrical circuit satisfactory for use in connection with the system seen in Figures 1 to 4 inclusive; and Figure 6 is a diagrammatic showing of a slightly different form of electrical circuit also satisfactory for use in connection with the system seen in Figures 1 to 4 inclusive.

As shown on the drawings:

It will be noted that with our system, the operator or pilot has full and complete control over the fuel pressure at all times and may readily vary this pressure to effectively meet varying conditions of operation. It will further be noted that a decided safety factor is present under many conditions of operation in that either pump may operate to provide the engine with pressured fuel without any aid whatever from the other pump, or both pumps may operate together as circumstances warrant. One of the main advantages of this system resides in the fact that whatever fuel pressure a pilot may decide in his own mind is proper, he may himself obtain.

In Figures 1 to 4 inclusive we have shown our system arranged with two separate fuel supply sources, with means for shifting from one source of supply to the other as the occasion may demand. These two sources of supply may be in the nature of a main fuel tank, and an auxiliary fuel tank. Shifting from one tank to the other entails no difficulties whatsoever, and the arrangement now about to be described leaves the operator or the pilot in full control of the fuel pressure.

With reference to Figure 1, it will be seen that in the fuel supply arrangement there is a tank $1a$ having associated with it a booster pump $5a$, and a tank $1b$ having associated with it a booster pump $5b$. Both the tanks $1a$ and $1b$ and the booster pumps $5a$ and $5b$ are identical in all respects. Each supply tank is vented as indicated at 6 so as to take advantage of ambient air pressure. At its bottom, each supply tank communicates through a suitable opening with its respective booster pump, it being feasible to support the booster pump on the bottom of the tank if so desired.

Each booster pump $5a$ or $5b$, which is of the centrifugal type, embodies a casing shaped to define a pump chamber in the upper portion in open communication with the interior of the respective supply tanks. The fuel delivery lines leading from the tanks also connect each with its respective pump chamber, and there is always a direct connection from the respective supply tank to the respective pipe line regardless of whether or not the booster pump is in operation. Each pump includes a motor for driving the impeller, and the impeller is preferably of a type to beat out vapor or air bubbles from the fuel.

A delivery pipeline 38 leads away from the tank $1a$, and a similar delivery pipeline 39 leads away from the tank $1b$, these pipelines extending to a common junction point defined by a valve mechanism generally indicated by numeral 40. From the junction point the main fuel supply pipeline 2 leads to the fuel consuming device or the internal combustion engine 3. In this main pipeline 2 is a main fuel pump 4 which may be connected in series with either booster pump $5a$ or $5b$.

This main fuel pump preferably includes an offset rotor of the sliding vane type in the lower part of its casing. It may also include the necessary relief valve mechanism. A suitable by-pass is also embodied in the pump so that the engine may be adequately supplied with fuel by either booster pump $5a$ or $5b$ even though the main fuel pump 4 becomes out of order. This main pump 4 may be driven by the fuel consuming device 3 or any other satisfactory driving means as may be deemed most feasible.

In this instance a filtering arrangement is also included in the main supply pipe line. This filter arrangement includes a casing 41 to opposite ends of which the pipeline is connected. Inside the casing 41, near the top thereof, an annular partition member 42 is provided. This partition member has a central opening through which the fuel may pass, and suspended from the partition member adjacent this central opening is a pair of filter elements including a conical filter member 43 and a cylindrical filter member 44 surrounding the conical member. It will be seen, therefore, that the fuel traveling through the pipeline 2 must pass through both the conical and cylindrical filter members, and any solid or semi-solid impurities carried by the fuel will thereby be removed before the fuel reaches the consuming device 3.

The valve mechanism generally indicated by numeral 40 is arranged not only to shift the flow of fuel from one supply tank to the other, but is also arranged to automatically energize the booster pump associated with the tank from which fuel is being taken, and de-energize the other booster pump. That is, assuming that one of the booster pumps was in operation at the time the shift from one tank to the other was made. In the event neither booster pump was in operation at such time, the valve mechanism automatically establishes the proper circuit connections for the immediate energization of the proper booster pump by the operator or pilot through his control mechanism, and leaves no possibility of mistake on the part of the pilot. The pilot uses only one control, of the character of the control 23 above described, for operating either of the booster pumps 5a and 5b, and the necessary circuit changes contingent with a shift from one supply tank to the other are automatically made by the actuation of the valve means 40.

These valve means 40 include a housing 45 which is plugged at one end as indicated by 46 in Figure 3. A shaft 47 extends through the housing 45 and carries on its outer end a hand wheel or the equivalent 48. The hand wheel carries a projecting lug 49 arranged to abut stop members 50 and 51 disposed substantially 90° apart so as to limit the turning movement of the valve means. At the inner end thereof the shaft 47 carries a two-way valve plug 52 having a substantially right angular or L-shaped passage 53 therethrough.

As the structure is viewed in Figures 1 and 2, the hand wheel and valve plug 52 are in such position that fuel is being taken from the tank 1a, the passage 53 in the valve plug establishing communication between the delivery pipeline 38 and the main fuel supply pipeline 2. When the hand wheel is turned counter-clockwise from the position seen in Figure 1, until the lug 49 abuts the stop member 51, a resultant counter-clockwise shift of the valve plug will result, and the plug will be changed from the position seen in Figure 2 to such position that the delivery pipeline 39 from the tank 1b is connected with the main supply pipeline 2. Each time such a shift is made from one tank to another, a corresponding change is made in the electrical circuit including the booster pumps 5a and 5b so that the proper booster pump will either be energized or made ready for energization. Two forms of such an electrical circuit are illustrated in Figures 5 and 6 respectively, separate from the apparatus for the purpose of clarity.

The means for effecting such circuit changes include an insulating sleeve 54 fixed to the shaft 47 for rotation therewith. This insulating sleeve carries a pair of spaced arcuate conductive members 55 and 56, preferably imbedded in the sleeve. Each conducting member is provided with a pair of spaced projecting contactors 57 and 58 adjacent opposite ends of the conducting member, as best seen in Figure 4. A set of three terminals, spaced around the housing 45, equidistantly or otherwise, is provided for each of the conducting members 55 and 56. Thus, with reference to Figure 4, it will be seen that the conducting member 56 has associated with it terminals 59, 60 and 61. Each of these terminals is provided with an inner bifurcated or split contact making portion 62 which is engageable by one or the other of the contact extensions 57 and 58. Three similar terminals, 63, 64 and 65 are likewise associated with the arcuate conducting member 55, all of these terminals being illustrated diagrammatically in Figures 5 and 6, wherein the arcuate conducting members 55 and 56 are also illustrated diagrammatically in the form of doubly pointed needles.

With reference to Figures 4, 5, and 6, it will be noted that the conductive member 56 is in circuit connection with the terminal 59 regardless of which position the valve means may be in. This conductive member 56 establishes circuit connection between the terminals 59 and 60 when fuel is being drawn from the tank 1a with the apparatus in position seen in Figures 1 to 4 inclusive. Now, if a shift is made to tank 1b, the conductive member 56 moves counter-clockwise, as seen in Figure 4, the contact extension 57 then engaging the inner end of terminal 59, and the contact extension 58 leaving the terminal 59 and engaging the inner end of terminal 61 so that circuit connection is now established between terminal 59 and terminal 61. Likewise, when fuel is being drawn from tank 1a, circuit connection is established through the conductive member 55 between terminal 63 and terminal 64, and when a shift is made to tank 1b, circuit connection is then established through conductive member 55 between terminals 63 and 65. Thus, it will be seen that a different circuit connection is made with each mechanical adjustment of the valve means 40 so as to shift from one fuel supply tank to the other.

Now, with reference to the wiring diagram of Figure 5, it will be seen that when fuel is being drawn from the supply tank 1a, the booster pump 5a is either in operation or ready to be placed in operation at the will of the operator or pilot. In this particular arrangement, a control device generally indicated by numeral 23, is utilized, but this particular control device does not include a main circuit control switch 25. Therefore, when a main line switch 66, which may be the ignition switch or some separate switch as may be preferred, is closed, the booster pump 5a will run constantly at its normal speed. The control device 23 gives the operator or pilot no control over the energization and complete de-energization of either booster pump, but only provides the pilot with a variable speed control for either pump. The control device 23 includes not only a switch 28 but a movable contact member 31 which travels over a resistance element 32, all parts of the switch being preferably controlled or actuated by a single knob or handle.

Assuming now that fuel is being taken from tank 1a, and that the main line switch 66 is closed, current will flow through conductor 67 from a suitable source of energy, conductor 68, terminal 59, conductive member 56, terminal 60, conductor 69, field 70 of the motor 5a, conductor 71, through the motor, and back to the source of energy through conductor 72. Thus, it will be seen that the booster pump 5a is operating at its normal speed as determined by the field winding of its motor. At the same time, it will be noted that booster pump 5b fails to operate by virtue of the open circuit at terminals 61 and 65.

Now, assuming that the pilot operates the control device so as to close switch 28, we find that the current may flow through conductor 67, switch 28, conductor 73, movable contact 31, a portion of the resistance element 32, conductor 74 to terminal 63, through arcuate conductive member 55, terminal 64, conductor 75, through the motor 5a, and back to the source via conductor 72. It will be noted that in this instance the resistance element 32 is in shunt with the field winding 70 of the motor. The pilot may then vary the speed of the motor 5a by moving the contact 31 over the resistance element 32. It will be understood that when an airplane engine is started it is not necessary to close switch 28, since the pressure developed in the fuel line at the low or normal speed of the booster pump as determined by its own field winding has been found satisfactory for priming the system and providing sufficient pressure for the starting of the engine.

However, during the take-off, the booster pump is preferably called upon to perform emergency duty, that is, operate at a higher than normal speed, and produce full carburetor pressure to reduce the risk of a failure of the main fuel pump which under such circumstances might likely prove disastrous. The pilot, by gradually cutting resistance out of the circuit by operating the contact member 31, will increase the speed of the booster pump motor, so that if the main fuel pump should fail during the take-off, the risk to the occupants of the airplane due to such failure is entirely avoided. After the plane has reached a safe altitude following the take-off, the booster pump may be entirely cut out by reverse operation of the control device 23. It will be apparent that the booster pump may be cut in and out of service at any time the pilot may deem meet. It is especially desirable to have the booster pump in operation while flying at high altitudes because there is a dropping of ambient air pressure and consequent vapor formation, with a likelihood of considerable bubbling of fuel in the supply tank. The booster pump then not only augments the action of the main fuel pump so as to keep the pressure up to the desired amount but by virtue of its operation will automatically beat out any vapor or gas bubbles in the fuel so that only pure, bubble-free liquid fuel will be delivered to the engine.

When a shift is made from fuel supply tank 1a to fuel supply tank 1b, the conductive members 55 and 56 will be rotated counter-clockwise so as to break the circuit through terminals 60 and 64, and establish the circuit through terminals 61 and 65, thus cutting in booster pump motor 5b. In this instance, with switch 28 open, the booster pump 5b will operate continuously at its normal speed, and current will flow through conductor 67, conductor 68, terminal 59, conductive member 56, terminal 61, conductor 76, field 77 of the motor, conductor 78, through the motor, and through conductor 79 to the other side of the line 72. Likewise, when switch 28 is closed, the resistance element 32 will be shunting the field winding 77 of the motor by virtue of conductor 80 leading to terminal 65 now in circuit, and the motor speed may be varied by movement of the contact member 31 over the resistance element 32.

In Figure 6 we have illustrated another diagrammatic wiring diagram satisfactory for use in connection with dual tank system of Figure 1. In the instance of Figure 6, a control device 23 of the same character as that seen in Figure 1 is utilized. The connections in general are substantially the same as above described in connection with Figure 5, with the exception that the conductor 68 from the terminal 59 to the line wire 67 has been omitted and conductor 81 utilized instead which leads to a conductor 82 connecting the two switches 25 and 28. A line wire 67 is connected directly to one side of the switch 25, which switch acts to energize initially either one of the booster pumps 5a or 5b, and the line switch 66 seen in Figure 5 has been eliminated by the use of the switch 25 in the control device 23.

In operation, the circuit of Figure 6 is substantially similar to that of Figure 5, with the exception that the Figure 6 circuit gives the pilot or operator complete control over the initial energization of either of the booster pumps. The closing of switch 25 permits whichever pump is in circuit, depending upon which tank fuel is being drawn from, to operate at its normal speed as determined by its own field winding. Closing of the switch 28 brings the rheostat arrangement 31—32 into play, and gives the operator or pilot variable speed control over either of the booster pumps 5a or 5b as above explained in connection with Figure 5.

From the foregoing, it is apparent that we have provided a novel and highly efficient fuel system, greatly desirable for use on aircraft, although the fuel system in any of its different showings may be used with other devices as well.

It will be noted that with our novel system the pilot or operator has complete and effective control over the speed of the fuel pumping means so as to supply fuel to the engine or other fuel consuming device at the desired pressure at all times regardless of conditions of operation. It will further be noted that the electrical arrangement giving the pilot or operator complete control over the speed of the pumping means is automatically connected or arranged for subsequent connection by the simple manipulation of a valve shifting the flow of fuel from one tank to the other. When such a shift is made, the pilot merely exercises his control in exactly the manner he did or would do in the event of only one fuel supply tank, and booster pumping means associated with either fuel tank are either automatically cut in the circuit, or cut out of circuit, depending upon which tank the means are associated with.

Consequently, the system is substantially foolproof, highly efficient in operation, and economical to install and use.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a fuel supply system, a pair of fuel supply tanks, a delivery pipeline leading from each of said tanks, an electrically operated booster pump in each said delivery pipeline, a fuel consuming device, a main pipeline leading from a junction of said delivery pipelines to said device, valve means for selectively connecting either of said delivery pipelines with said main pipeline, and means associated with said valve means to automatically energize the pump in the delivery pipeline connected with the main pipeline and de-energize the other pump.

2. In a fuel supply system, a plurality of fuel tanks, a main fuel supply line, a delivery pipeline leading from each tank to a common junction point with said main supply line, valve means at said junction point to selectively connect a desired delivery pipeline to said main supply line, an electrically operated pump in each delivery line, a circuit including the motors of all said pumps, and switch means operable with said valve means to connect in said circuit the pump motor of the delivery line connected to the main supply line and cut out of circuit the remainder of said pump motors.

3. In a fuel supply system, a plurality of fuel tanks, a main fuel supply line, a delivery pipeline leading from each tank to a common junction point with said main supply line, valve means at said junction point to selectively connect a desired delivery pipeline to said main supply line, an electrically operated pump in each delivery line, a circuit including the motors of all said pumps, a selectively variable speed control in said circuit and switch means operable with said valve means to put in circuit the pump motor associated with the selected delivery line and control the energization of the field of said pump motor while opening the circuit through the remainder of said pump motors.

4. In a fuel supply system, a plurality of fuel tanks, a delivery line from each tank to a common junction point, an electric pump in each delivery line, a supply line leading away from said junction point, and combination valve and switch means at said junction point operable in a single movement to connect a selected delivery line with said supply line and establish circuit connection with the respective pump while insuring an open circuit for the remainder of said pumps.

5. In a fuel supply system, a plurality of fuel tanks, a delivery line from each tank to a common junction point, an electric pump in each delivery line, a supply line leading away from said junction point, combination valve and switch means at said junction point operable in a single movement to connect a selected delivery line with said supply line and establish circuit connection with the respective pump while insuring an open circuit for the remainder of said pumps, and a selectively variable speed control also placed in circuit connection with the pump in the selected delivery line by the action of said combination valve and switch means.

6. In a fuel supply system, a pair of delivery pipelines leading to a common junction point, a supply pipe line leading away from said junction point, valve means at said junction point movable to selectively connect either of said delivery pipelines to said supply pipeline, an electric pump in each said delivery pipeline, and switch means carried by said valve means and operable therewith to establish circuit connection with the pump in the selected delivery pipeline and insure an open circuit to the other pump.

7. In a fuel supply system, a pair of delivery pipelines leading to a common junction point, a supply pipeline leading away from said junction point, valve means at said junction point movable to selectively connect either of said delivery pipelines to said supply pipeline, an electric pump in each said delivery pipeline, a selectively variable speed control for said pumps, and switch means operable by and with a movement of said valve means to establish circuit connection between the pump in the selected delivery pipeline and said speed control and insure an open circuit condition for the other pump.

8. In a fuel supply system, a pair of delivery pipelines leading to a common junction point, a supply pipeline leading away from said junction point, valve means at said junction point movable to selectively connect either of said delivery pipelines to said supply pipeline, an electric pump in each said delivery pipeline, a selectively variable speed control for said pumps, and dual switch means associated with and operable in response to a movement of said valve means to both establish a circuit connection with the pump in the selected delivery pipeline and also establish circuit connection between that pump and said speed control while insuring an open circuit condition for the other pump.

9. In a fluid supply system, a pair delivery lines leading from separate supply sources, an electric motor driven pump in each delivery line, a supply pipeline leading to a fluid receiving element, means establishing a common junction for said delivery lines and said supply pipeline, a two-way valve at said junction to selectively connect either delivery line with said supply pipeline, a shaft to actuate said valve, an electrical circuit including the motors of said pumps, and switch means in said circuit and movable with said shaft to establish a circuit connection with the motor of the pump in the selected delivery line and open the circuit to the other pump motor.

10. In a fluid supply system, a pair of delivery lines leading from separate supply sources, an electric motor driven pump in each delivery line, a supply pipeline leading to a fluid receiving element, means establishing a common junction for said delivery lines and said supply pipeline, a two-way valve at said junction to selectively connect either delivery line with said supply pipeline, a shaft to actuate said valve, an electrical circuit including the motors of said pumps, a variable speed control in said circuit, and a pair of separated switches on said shaft and in said circuit, one of which switches connects the motor of the pump in the selected delivery line in said circuit and opens said circuit to the other pump motor, and the other switch establishes circuit connection between the motor of the selected pump and said speed control.

RUSSELL R. CURTIS.
FREDERICK W. HECKERT.